(12) United States Patent
Adams et al.

(10) Patent No.: US 8,103,262 B2
(45) Date of Patent: *Jan. 24, 2012

(54) METHOD AND SYSTEM FOR FORWARDING CALLS PLACED TO A TELECOMMUNICATIONS DESTINATION

(75) Inventors: Neil Adams, Waterloo (CA); Raymond Vander Veen, Waterloo (CA)

(73) Assignee: Research In Motion Limited, Waterloo, Ontario (CA)

(*) Notice: Subject to any disclaimer, the term of this patent is extended or adjusted under 35 U.S.C. 154(b) by 0 days.

This patent is subject to a terminal disclaimer.

(21) Appl. No.: 12/957,950

(22) Filed: Dec. 1, 2010

(65) Prior Publication Data

US 2011/0069826 A1 Mar. 24, 2011

Related U.S. Application Data

(63) Continuation of application No. 11/191,006, filed on Jul. 28, 2005, now Pat. No. 7,869,799.

(51) Int. Cl.
*H04M 3/42* (2006.01)

(52) U.S. Cl. ... 455/417; 455/445; 455/461; 379/211.02; 379/212.01

(58) Field of Classification Search .................. 455/417, 455/445, 461; 379/207.03, 211.01–211.02, 379/212.01
See application file for complete search history.

(56) References Cited

U.S. PATENT DOCUMENTS

| | | | |
|---|---|---|---|
| 4,313,035 A | 1/1982 | Jordan et al. | |
| 5,222,123 A | 6/1993 | Brown et al. | |
| 5,243,645 A * | 9/1993 | Bissell et al. | 379/211.02 |
| 5,276,731 A | 1/1994 | Arbel et al. | |
| 5,315,636 A | 5/1994 | Patel | |
| 5,329,578 A | 7/1994 | Brennan et al. | |
| 5,369,695 A | 11/1994 | Chakravarti et al. | |
| 5,440,620 A | 8/1995 | Slusky | |
| 5,533,111 A * | 7/1996 | Schlanger | 379/229 |
| 5,550,907 A | 8/1996 | Carlsen | |
| 5,583,564 A | 12/1996 | Rao et al. | |
| 5,610,970 A | 3/1997 | Fuller et al. | |
| 5,742,905 A | 4/1998 | Pepe et al. | |
| 5,745,850 A * | 4/1998 | Aldermeshian et al. | 455/417 |
| 5,845,207 A * | 12/1998 | Amin et al. | 455/414.1 |
| 5,903,845 A * | 5/1999 | Buhrmann et al. | 455/461 |
| 5,905,789 A | 5/1999 | Will | |
| 5,978,673 A | 11/1999 | Alperovich et al. | |
| 6,038,451 A * | 3/2000 | Syed et al. | 455/445 |
| 6,130,938 A | 10/2000 | Erb | |
| 6,157,831 A * | 12/2000 | Lamb | 455/433 |
| 6,188,888 B1 * | 2/2001 | Bartle et al. | 455/417 |
| 6,301,350 B1 * | 10/2001 | Henningson et al. | 379/220.01 |

(Continued)

OTHER PUBLICATIONS

Norton Rose, Response to Examiner's Requisition, filed in respect of Canadian Patent Application No. 2,548,843, dated Oct. 17, 2011.

*Primary Examiner* — Sharad Rampuria
(74) *Attorney, Agent, or Firm* — Norton Rose OR LLP (57) ABSTRACT

The present invention provides a method for forwarding calls placed to a primary destination comprising receiving at least one call forwarding profiles, each call forwarding profile having a predefined duration and at least one call forwarding destination, receiving an instruction to activate one call forwarding profile to an activated profile and forwarding calls placed to the telecommunications destination according to the activated profile.

28 Claims, 4 Drawing Sheets

U.S. PATENT DOCUMENTS

| | | |
|---|---|---|
| 6,330,322 B1 | 12/2001 | Foladare et al. |
| 6,374,102 B1 | 4/2002 | Brachman et al. |
| 6,574,470 B1 * | 6/2003 | Chow et al. .................. 455/417 |
| 6,937,713 B1 * | 8/2005 | Kung et al. .............. 379/211.02 |
| 7,116,975 B1 * | 10/2006 | Link et al. ..................... 455/417 |
| 7,245,610 B1 * | 7/2007 | Kalmanek et al. ............ 370/352 |
| 7,664,491 B2 * | 2/2010 | Vander Veen ................ 455/417 |
| 7,769,392 B2 * | 8/2010 | Russell ..................... 455/456.1 |
| 7,869,799 B2 * | 1/2011 | Adams et al. ................ 455/417 |
| 2006/0109967 A1 * | 5/2006 | Kouchri et al. .......... 379/207.02 |

* cited by examiner

METHOD AND SYSTEM FOR FORWARDING CALLS PLACED TO A TELECOMMUNICATIONS DESTINATION

CROSS-REFERENCE TO RELATED APPLICATIONS

This application is a continuation of U.S. application Ser. No. 11/191,006, the entirety of which is hereby incorporated by reference.

FIELD OF THE INVENTION

This invention relates to the field of telecommunications and more particularly to methods of call forwarding within a communications network.

BACKGROUND

Mobile telecommunications devices are becoming more and more ubiquitous because they help users to communicate with the world. The popular PDA can function as a mobile or cellular phone, fax sender, and personal organizer. A PDA is a handheld mobile device that allows users to access information, keep track of their busy schedules, and communicate with others. Furthermore, many PDAs are capable of wireless connectivity and executing any number of software applications. It is very important for today's mobile professional to be able to effectively communicate with others from anywhere in the world.

Call forwarding is a common feature of both wired and wireless phones. The purpose of call forwarding is to route a call placed to a first calling destination, typically represented by a first phone number, to a second calling destination. There are numerous reasons a user may want to forward calls from the first calling destination to the second calling destination. For example, the phone representing the first calling destination may be low on battery or the user wants to forward calls placed to a wireless phone to a wired phone in order to save on wireless air-time costs.

Methods are known which allow a user to forward calls placed to a first phone number to another phone number. Typically, a user inputs a call forwarding code and a call forwarding destination into the first phone. Instructions regarding call forwarding are then sent to the service provider which then routes all calls placed to the first phone number to the call forwarding destination.

Methods are also known that allow users to schedule call forwarding to a particular call forwarding destination to occur at a future time. These methods, however, often require the user to continually update the schedule on a going forward basis.

Methods for forwarding calls to a telecommunications device having an improved ease of use are desired.

BRIEF DESCRIPTION OF THE DRAWINGS

Embodiments of the invention may best be understood by referring to the following description and accompanying drawings. In the description and drawings, like numerals refer to like structures or processes. In the drawings.

DETAILED DESCRIPTION OF THE PREFERRED EMBODIMENTS

In the following description, numerous specific details are set forth to provide a thorough understanding of the invention. However, it is understood that the invention may be practiced without these specific details. In other instances, well-known software, circuits, structures and techniques have not been described or shown in detail in order not to obscure the invention.

According to one broad aspect of the invention, there is provided a method for forwarding calls placed to a primary destination comprising receiving at least one call forwarding profile, each call forwarding profile having a predefined duration and at least one call forwarding destination, receiving an instruction to activate one call forwarding profile to an activated profile and forwarding calls placed to the telecommunications destination according to the activated profile.

Preferably, the at least one call forwarding destination is defined for a predetermined period of time.

Advantageously, the methods of the present invention provide for a user to define and store at least one call forwarding profile representing a desired call forwarding pattern. The user may then easily forward calls by activating the appropriate profile.

According to another aspect of the invention, there is provided a computer readable memory storing statements and instructions for use in the execution in a computer of the methods of the present invention. Preferably, the computer readable memory is in a server on a communications network.

According to another aspect of the invention, there is provided a data carrier product containing sequences of instructions which when executed causes the performance of the methods of the invention.

According to another aspect of the invention, there is provided a software product containing sequences of instructions which when executed causes the performance of the methods of the invention.

According to another aspect of the invention, there is provided an integrated circuit product containing sequences of instructions which when executed causes the performance of the methods of the invention.

According to another aspect of the invention, there is provided a memory for storing data for access by an application program being executed on a data processing system, comprising a data structure for a call forwarding profile stored in said memory, the data structure comprising call data comprising destination data representing at least one call forwarding destination, duration data representing a duration of the call forwarding profile and initiation data corresponding to a trigger for activating the call forwarding profile.

The advantages of the present invention are further illustrated by examples. The examples and their particular details set forth herein are presented for illustration only and should not be construed as a limitation on the claims of the present invention.

Generally, in accordance with an aspect of the invention, there is provided methods of forwarding calls placed to a primary destination within a telecommunications network that is wired, wireless or a combination thereof. The primary destination may be any telecommunications destination and is typically represented by a telephone number. Calls placed to a telecommunications destination may be answered using a telecommunications device, such as a telephone or mobile phone, coupled to communicate with the telecommunications network, preferably wirelessly. It will be understood by a person skilled in the art that although the embodiments of the present invention are described largely with respect to telephone numbers and telephone destinations, a telecommunications destination may be any destination capable of receiving data within a telecommunication network.

Figure 1:
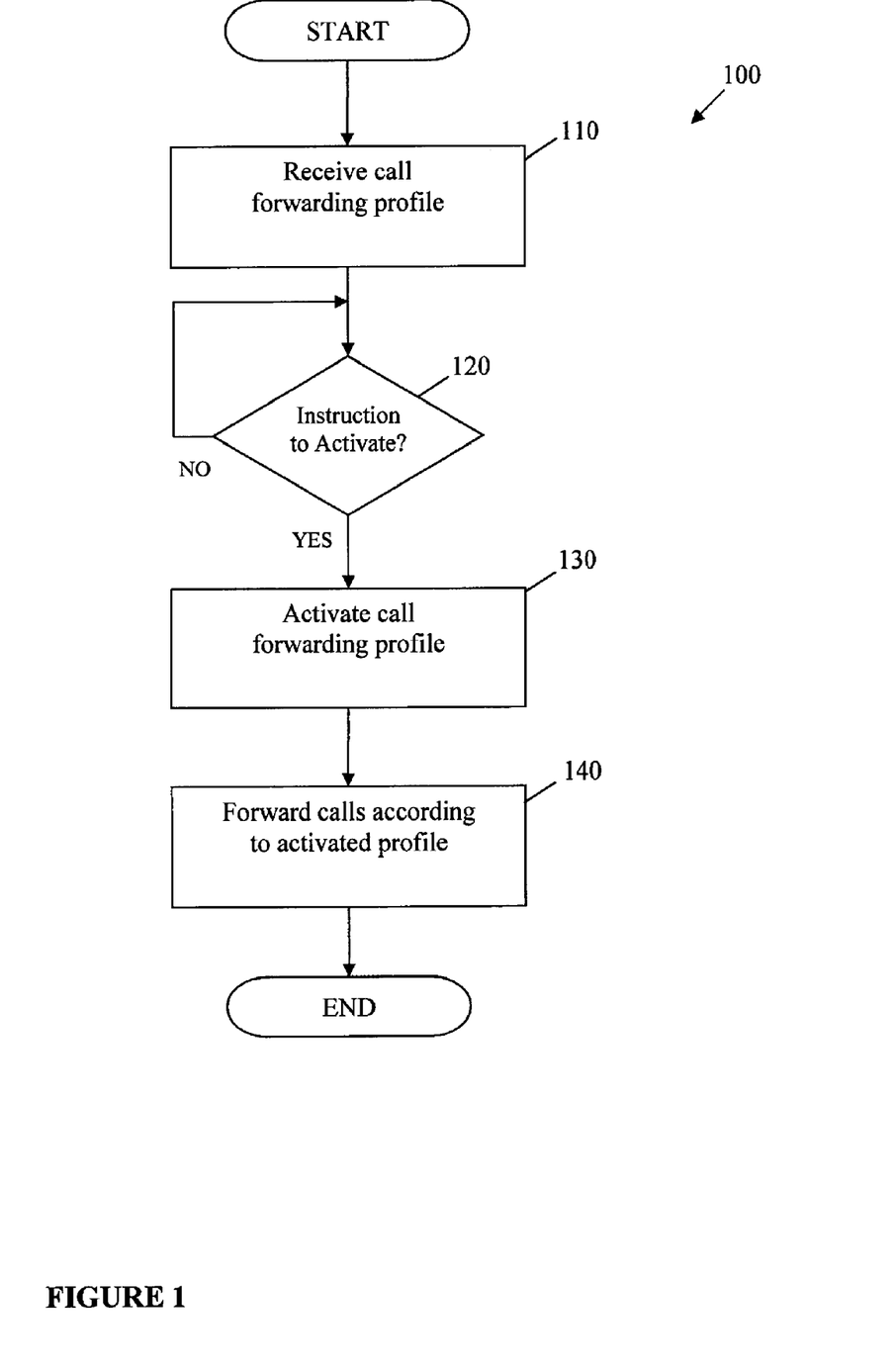
FIG. 1 is a flowchart illustrating operations for forwarding calls placed to a telecommunications device according to a first embodiment of the invention.

Referring to FIG. 1, a flowchart illustrating operations 100 according to a first embodiment of the invention is provided. At step 110, a call forwarding profile is received. The call forwarding profile has a predefined duration and has at least one call forwarding destination.

The call forwarding destination is the desired telecommunications destination to which calls, placed to the primary destination, will be forwarded. The call forwarding profile preferably also comprises a predetermined time period associated with the call forwarding destination, the predetermined time being and in the course of the duration of the call forwarding profile.

If an instruction is received to activate the call forwarding profile at step 120, at step 130, the call forwarding profile is activated to an activated profile. At step 140, calls to the primary destination are forwarded according to the activated profile.

An example of a work call forwarding profile is shown below as Example 1.

EXAMPLE 1

Work Profile number 1: (555) 555-1111 (work) Time of Day: 9:00 (Day 1)-12:00 (Day 1)
number 2: (555) 555-1111 (work) Time of Day: 13:00 (Day 1)-17:00 (Day 1)
number 3: (555) 555-2222 (home) Time of Day: 18:00 (Day 1)-8:00 (Day 2)
Duration: terminate 24 hours from activation This Example 1 work profile may represent a call forwarding profile for a user who has a mobile phone and a mobile number, representing the primary destination, and a nine to five desk job. Preferably, the user inputs the work profile through an interface on the mobile phone and the work profile is then stored on a memory resident on the mobile phone. The work profile has a duration of 24 hours and within that 24 hour period, there are three call forwarding destinations defined for three predetermined time periods. The user may activate the work profile through the interface on the user's mobile phone resulting in the telecommunications network forwarding calls placed to the primary destination according to the activated work profile. Therefore, if the user activates the profile when driving to work at 8:30 Monday morning, the instruction is then given to the telecommunications network to forward calls according to the activated work profile. The telecommunications network compares the present time, 8:30, to the work profile and determines that there is no call forwarding destination defined for 8:30. Thus, calls to the mobile number will continue to be placed to the mobile device. At 9:00, until 12:00, calls to the mobile number are forwarded by the telecommunications network to the user's telephone at the user's desk at work, (555) 555-1111. At 12:00, calls to the user's mobile number cease to be forwarded until 13:00, at which time calls are again forwarded to the user's desk until 17:00. At 17:00, calls are again un-forwarded as the user leaves work and begins to drive home. At 18:00, when the user typically arrives home, calls to the user's mobile phone are forwarded to the user's home telephone until 8:00 the next morning. As the duration of the profile is 24 hours, the activated profile may terminate 24 hours after activation (at 8:30 the next day).

In another embodiment of the invention, the call forwarding profile may include a termination time regardless of the duration. Therefore even though the above work profile has a duration of 24 hours, a user may define a termination time of 23:00 on Day 2. Therefore, no matter what time the profile is activated (whether at 8:30 or 23:01), it will shut off at 23:00 on Day 2.

Figure 2:
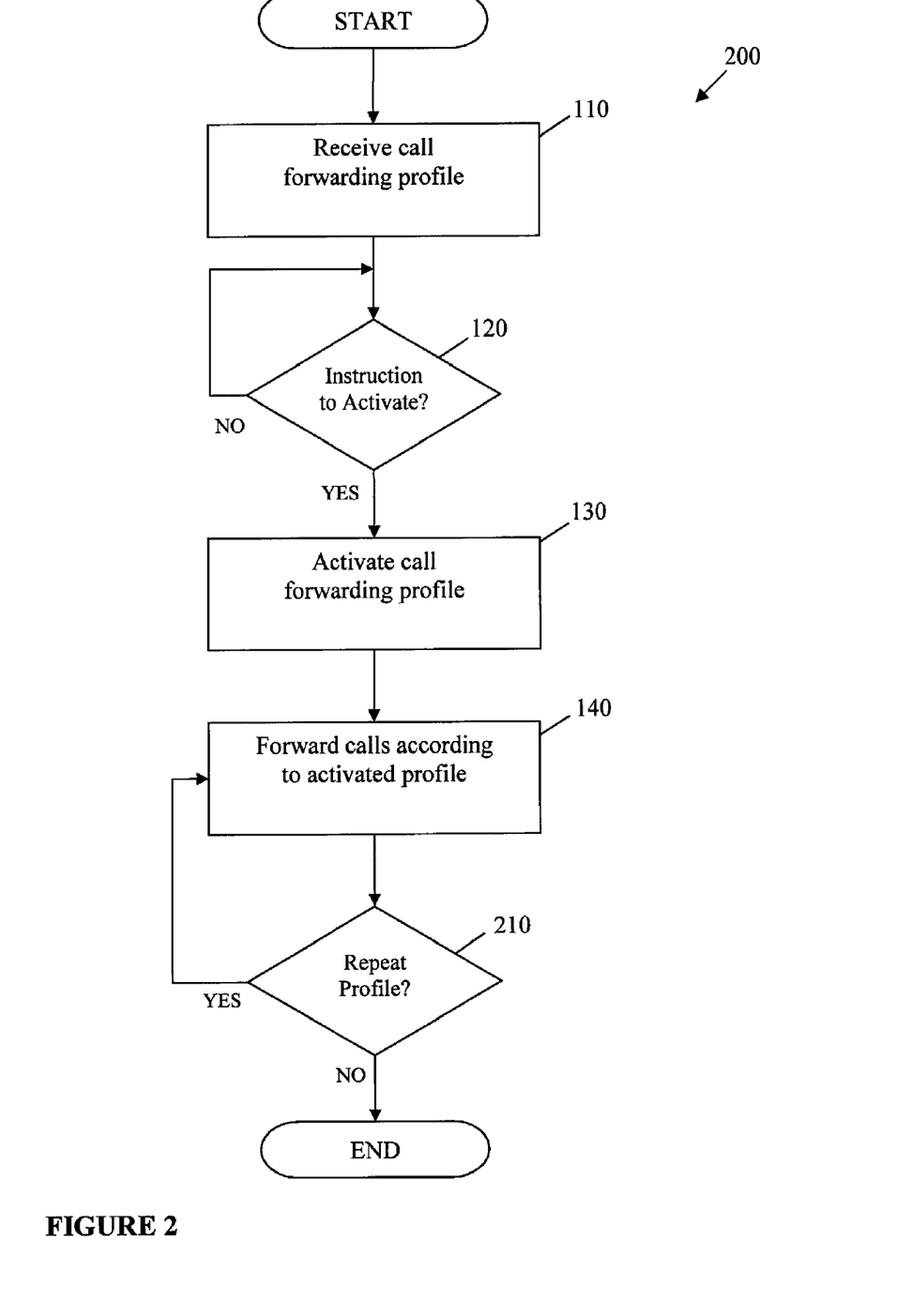
FIG. 2 is a flowchart illustrating operations for forwarding calls placed to a telecommunications device according to a second embodiment of the invention.

In yet another embodiment of the invention, an activated profile continues to cycle until terminated by the user. Referring to FIG. 2, a flowchart illustrating operations 200 according to this embodiment of the invention is provided. Operations 200 contain additional decision step 210. If the call forwarding profile is defined to be a repeating profile, at step 210 the profile is immediately restarted and calls are forwarded according to the call forwarding profile at step 140. For example, in respect of the work profile above, a user may activate the profile on Monday morning and the profile will cycle every 24 hours resulting in the calls being forwarded according to the work profile daily until the profile is deactivated by the user, for example, on Friday night after the work week.

A call forwarding profile may also have a duration of longer than 24 hours. For example a weekend profile may be set as follows:

EXAMPLE 2

Weekend Profile number 1: (555) 555-3333 (parents) Time of Day: 12:00 (Day 1)-14:00 (Day 1)
number 2: (555) 555-2222 (home) Time of Day: 20:00 (Day 1)-8:00 (Day 3)
Duration: Terminate at 8:01 on Day 3

In this Example 2, if a user activates the profile Saturday morning, calls to the user's mobile phone will be forwarded to the user's parent house at (555) 555-3333 from 12:00 to 14:00 on Day 1, namely Saturday, after which calls will not be forwarded until 20:00 that night. At 20:00 Saturday night, calls will be forwarded to the user's home until 8:00 on Day 3, namely Monday, at which time cans will un-forwarded and the profile deactivated one minute later at 8:01 on Monday.

Although Examples 1 and 2 comprise profiles defined by Day X, a person skilled in the art would understand that a call forwarding profile may comprise call forwarding destinations defined for a particular time of day for a particular day of the week as shown in the below Example 3.

EXAMPLE 3

Weekend Profile 2 number 1: (555) 555-3333 (parents) Time of Day: 12:00 (Saturday)-14:00 (Saturday)
number 2: (555) 555-2222 (home) Time of Day: 20:00 (Saturday) 8:00 (Monday)
Duration: Terminate at 8:01 on Monday In another embodiment of the invention, a call forwarding profile may comprise call forwarding destinations associated with not hours of the day but a predetermined time period following activation.

EXAMPLE 4

Shift Profile number 1: (555) 555-1111 (work) Hour 0 Minute 0-Hour 3 Minute 0 number 2: (555) 555-1111 (work) Hour 4 Minute 0-Hour 8 Minute 0

Duration: Terminate at Hour 8 Minute 1

The shift profile of Example 4 may be particularly useful for shift workers that have a constantly changing start time for work, but once at work, the pattern of call forwarding desired by the user is predictable. In this instance, the user starts the call forwarding profile on beginning a work shift. According to the above shift profile, on activating the shift profile on beginning a work shift, calls to the user's mobile number are automatically forwarded by the telecommunications network to (555) 555-1111 for 3 hours. Calls are then un-forwarded for 1 hour (between hours 3 and 4). At Hour 4, calls are forwarded to (555) 555-1111 for another four hours before un-forwarding the phone and de-activating the profile 8 hours and 1 minute after the shift profile was activated.

It will be understood by a person skilled in the art that a user may therefore input and store multiple call forwarding profiles and activate the appropriate profile at the appropriate time.

Although in the above examples, the trigger to activate a call forwarding profile is activation by a user, other triggers may be employed. Call forwarding profiles may therefore be set to activate automatically in response to the time of day, calendar date, day of the week, or a calendar hook such as an appointment entered into an electronic calendar.

Figure 3:
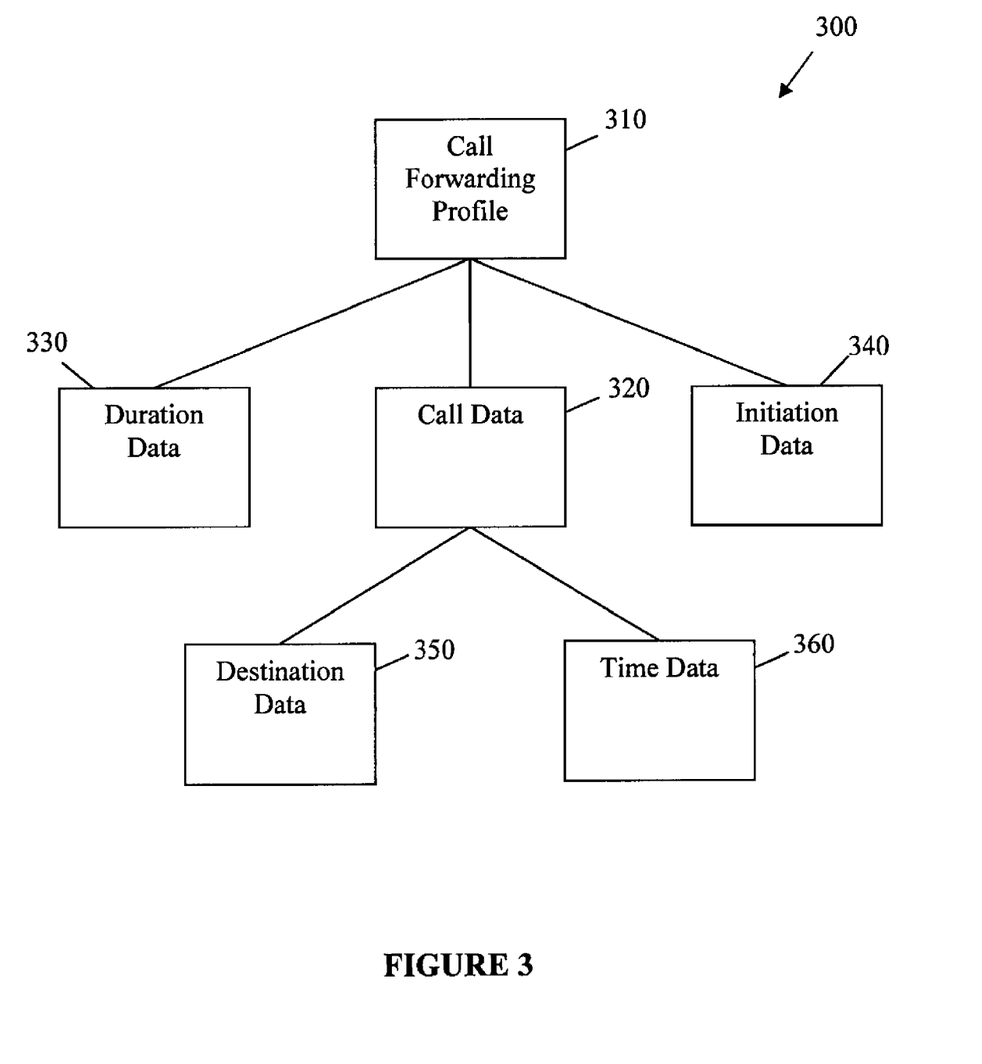
FIG. 3 is a schematic showing a data structure for a call forwarding profile.

Referring to FIG. 3, according to another aspect of the invention, a memory is provided for storing data for access by a call forwarding application being executed on a data processing system. The memory comprises a data structure 300 for a call forwarding profile 310 stored in the memory. The data structure 300 for the call forwarding profile 310 comprises information resident in a database used by the call forwarding application program and includes call data 320 comprising destination data 350 representing at least one call forwarding destination, duration data 330 representing a duration of the call forwarding profile and initiation data 340 corresponding to a trigger for activating the call profile. Preferably, call data 320 further comprises destination time data 360 representing the time period during which calls are forwarded to a particular call forwarding destination. The trigger for activating a particular call forwarding profile may be selected from the group comprising the time of day, calendar date, day of the week, a calendar hook, such as an appointment entered into an electronic calendar, and use input.

Figure 4:
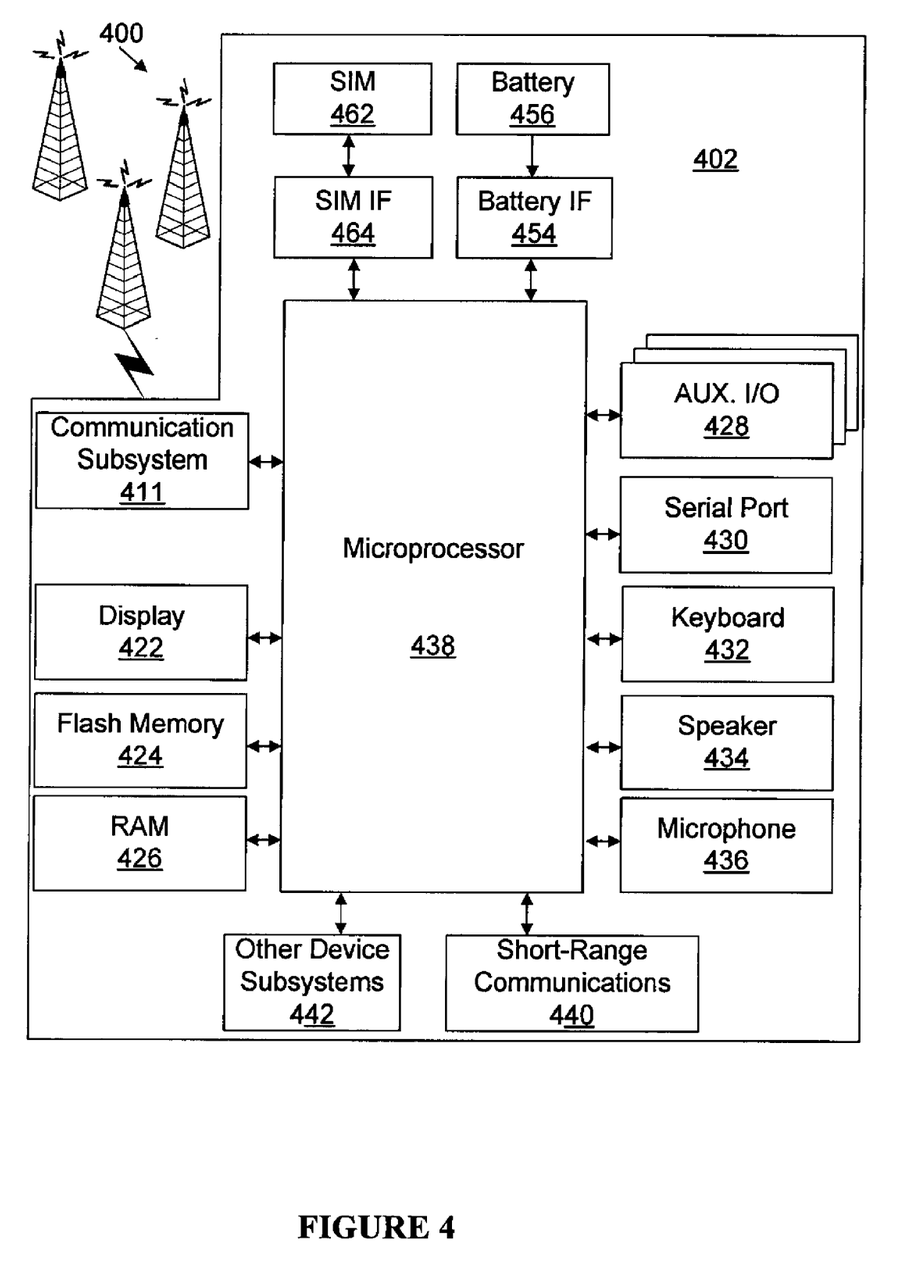
FIG. 4 shows a mobile telecommunications device having a memory for storing the data structure of the present invention.

Referring to FIG. 4, a mobile electronic device 402 capable of telecommunications is shown. Mobile electronic device 402, as described below, provides an interface though which call forwarding profiles of the embodiments of the present invention may be inputted. Mobile electronic device 402 also comprises a memory comprising the data structures of the present invention. The mobile electronic device 402 is preferably a two-way communication device having at least voice and advanced data communication capabilities, including the capability to communicate with other computer systems. Depending on the functionality provided by mobile electronic device 402, it may be referred to as a data messaging device, a two-way pager, a cellular telephone with data messaging capabilities, a wireless Internet appliance, or a data communication device (with or without telephony capabilities). Mobile electronic device 402 may communicate via a network 400, in this embodiment, anyone of a plurality of fixed transceiver stations within its geographic coverage area.

Mobile electronic device 402 will normally incorporate a communication subsystem 411, which includes a receiver, a transmitter, and associated components, such as one or more (preferably embedded or internal) antenna elements and, local oscillators (LOs), and a processing module such as a digital signal processor (DSP) (all not shown). Communication subsystem 411. As will be apparent to those skilled in field of communications, particular design of communication subsystem 411 depends on the communication network in which mobile electronic device 402 is intended to operate. In this embodiment of the invention communication subsystem 411 includes a receiver configured to receive data from a positioning system 470 to accurately determine the global position of mobile electronic device 402.

Network access is associated with a subscriber or user of mobile electronic device 402 and therefore mobile electronic device 402 requires a Subscriber Identity Module or "SIM" card 462 to be inserted in a SIM IF 464 in order to operate in the network. Mobile electronic device 202 is a battery-powered device so it also includes a battery IF 454 for receiving one or more rechargeable batteries 456. Such a battery 456 provides electrical power to most if not all 10 electrical circuitry in mobile electronic device 402, and battery IF 454 provides for a mechanical and electrical connection for it. The battery IF 454 is coupled to a regulator (not shown) which provides power V+ to all of the circuitry.

Mobile electronic device 402 includes a controller such as a microprocessor 438 which controls overall operation of mobile electronic device 402. Communication functions, including at least data and voice communications, are performed through communication subsystem 411. Microprocessor 438 also interacts with additional device subsystems such as a display 422, a flash memory 424, a random access memory (RAM) 426, auxiliary input/output (I/O) subsystems 428, a serial port 430, a keyboard 432, a speaker 434, a microphone 436, a short-range communications subsystem 440, and any other device subsystems generally designated at 442. Microprocessor is also capable of adjusting the intensity of backlight 420 according to a state of at least one light condition affecting ambient light at the global position of the device. Some of the subsystems shown in FIG. 4 perform communication-related functions, whereas other subsystems may provide "resident" or on-device functions. Notably, some subsystems, such as keyboard 432 and display 422, for example, may be used for both communication-related functions, such as entering a text message for transmission over a communication network, and device-resident functions such as a calculator or task list. Keyboard 432 and display 422 form on possible interface throughout which a user may input a call forwarding profile according to the embodiments of the present invention. Operating system software used by microprocessor 438 is preferably stored in a persistent store such as flash memory 424, which may alternatively be a read-only memory (ROM) or similar storage element (not shown). Those skilled in the art will appreciate that the operating system, specific device applications, or parts thereof, may be temporarily loaded into a volatile store such as RAM 426.

Microprocessor 438, in addition to its operating system functions, preferably enables execution of software applications on mobile electronic device 402. A predetermined set of applications which control basic device operations, including at least data and voice communication applications, will normally be installed on mobile electronic device 402 during its manufacture. A preferred application that may be loaded onto mobile electronic device 402 may be a personal information manager (PIM) application having the ability to organize and manage data items relating to the user such as, but not limited to, instant messaging (IM), e-mail, calendar events, voice mails, appointments, and task items. Naturally, one or more memory stores are available on mobile electronic device 402 and SIM 462 to facilitate storage of PIM data items and other information.

The PIM application preferably has the ability to send and receive data items via the wireless network. In a preferred embodiment, PIM data items are seamlessly integrated, synchronized, and updated via the wireless network, with the mobile electronic device user's corresponding data items stored and/or associated with a host computer system thereby creating a mirrored host computer on mobile electronic device 402 with respect to such items. This is especially advantageous where the host computer system is the mobile electronic device user's office computer system. Additional applications may also be loaded onto mobile electronic device 402 through network 400, an auxiliary I/O subsystem 428, serial port 430, short-range communications subsystem 440, or any other suitable subsystem 442, and installed by a user in RAM 426 or preferably a non-volatile store (not shown) for execution by microprocessor 438. Such flexibility in application installation increases the functionality of mobile electronic device 402 and may provide enhanced on-device functions, communication-related functions, or both. For example, secure communication applications may enable electronic commerce functions and other such financial transactions to be performed using mobile electronic device 402.

In a data communication mode, a received signal such as a text message, an e-mail message, or web page download will be processed by communication subsystem 411 and input to microprocessor 438. Microprocessor 438 will preferably further process the signal for output to display 422, to auxiliary I/O device 428 or both. A user of mobile electronic device 402 may also compose data items, such as e-mail messages, for example, using keyboard 432 in conjunction with display 422 and possibly auxiliary I/O device 428. Keyboard 432 is preferably a telephone type keypad, full alphanumeric keyboard or full or condensed QWERTY keypad. These composed items may be transmitted over a communication network through communication subsystem 411.

For voice communications, the overall operation of mobile electronic device 402 is substantially similar, except that the received signals would be output to speaker 434 and signals for transmission would be generated by microphone 436. Alternative voice or audio I/O subsystems, such as a voice message recording subsystem, may also be implemented on mobile electronic device 402. Although voice or audio signal output is preferably accomplished primarily through speaker 434, display 422 may also be used to provide an indication of the identity of a calling party, duration of a voice call, or other voice call related information, as some examples Serial port 430 in FIG. 4 is normally implemented in a personal digital assistant (PDA) type communication device for which synchronization with a user's desktop computer is a desirable, albeit optional, component. Serial port 430 enables a user to set preferences through an external device or software application and extends the capabilities of mobile electronic device 402 by providing for information or software downloads to mobile electronic device 402 other than through a wireless communication network. The alternate download path may, for example, be used to load an encryption key onto mobile electronic device 402 through a direct and thus reliable and trusted connection to thereby provide secure device communication.

Short-range communications subsystem 440 of FIG. 4 is an additional optional component which provides for communication between mobile electronic device 402 and different systems or devices, which need not necessarily be similar devices. For example, subsystem 240 may include an infrared device and associated circuits and components, or a Bluetooth™ communication module to provide for communication with similarly-enabled systems and devices. Bluetooth™ is a registered trademark of Bluetooth SIG, Inc.

In accordance with an embodiment of the invention, mobile electronic device 402 is configured for sending and receiving data items and includes a PIM for organizing and managing data items relating to the user such as, but not limited to, instant messaging (1M), e-mail, calendar events, calendar appointments, and task items, etc. By way of example, mobile electronic device 402 is configured for voice (which may include push to talk over cellular (POC)) and data services, voice mail service, e-mail service, SMS and chat services to which the user subscribes. To provide a user-friendly environment to control the operation of mobile electronic device 402, PIM together with the operation system and various software applications resident on the station 402 provides a GUI having a main screen from which to access various services via applications stored on said device or available to it, including but not limited to applications relating to inputting a call forwarding profile.

Some or all the instructions representing the methods in respect of embodiments, in accordance with one aspect of the invention, may be stored in any of the memory stores described above and executed by microprocessor 438. Furthermore, any of the memory stores may comprise the data structures described above with respect to embodiments in accordance with another aspect of the invention.

The sequences of instructions which when executed cause the methods described herein to be performed by system 500 can be contained in a data carrier product for transmission such as embodied in a carrier wave according to one embodiment of the invention.

The sequences of instructions which when executed cause the methods described herein to be performed by system 500 can be contained in a computer software product according to one embodiment of the invention. This computer software product can be loaded into and run by system 500.

The sequences of instructions which when executed cause the methods described herein to be performed by system 500 can be contained in an integrated circuit product including a coprocessor or memory according to one embodiment of the invention. This integrated circuit product can be installed in system 500.

Although preferred embodiments of the invention have been described herein, it will be understood by those skilled in the art that variations may be made thereto without departing from the spirit of the invention or the scope of the appended claims.

The invention claimed is:

1. A method of forwarding calls placed to a primary phone number comprising:
receiving at least one call forwarding profile, the at least one call forwarding profile having a predefined duration, at least one call forwarding phone number, and at least one predetermined time period of activation within the predefined duration for forwarding calls placed to the primary phone number to the at least one call forwarding phone number;
receiving an instruction to activate the at least one call forwarding profile; and forwarding calls placed to the primary phone number according to the activated call forwarding profile, wherein the at least one call forwarding profile defines at least one predetermined time period within the predefined duration in which calls placed to the phone number are not forwarded.

2. The method of claim 1, wherein the at least one call forwarding profile defines two or more predetermined time periods of activation within the predetermined duration for forwarding calls placed to the primary phone number.

3. The method of claim 1, wherein the at least one call forwarding profile is automatically de-activated after the duration has elapsed.

4. The method of claim 1, wherein the instruction to activate the at least one call forwarding profile is generated in response to a trigger.

5. The method of claim 4, wherein the trigger is selected from the group comprising of time of day, calendar date, day of the week, calendar hook and user input.

6. A data processing system having a processor and a memory for storing data for access by an application program being executed on the data processing system, the data processing system being configured by the application program to process a data structure for a call forwarding profile stored in the memory, the data structure comprising:

call data comprising destination data representing at least one call forwarding destination;

duration data representing a duration of the at least one call forwarding profile;

time data representing at least one predetermined time period of activation within the duration for forwarding calls to the at least one call forwarding destination; and initiation data corresponding to a trigger for activating the at least one call forwarding profile, wherein the at least one call forwarding profile defines at least one predetermined time period within the predefined duration in which calls placed to the phone number are not forwarded.

7. The data processing system of claim 6, wherein the at least one call forwarding profile is automatically de-activated after the duration has elapsed.

8. The data processing system of claim 6, wherein the trigger is selected from the group comprising of time of day, specific date, day of the week, calendar hook and user input.

9. A computer readable storage device storing statements and instructions for use in the execution in a computer of the method of claim 1.

10. A wireless device comprising the readable storage device of claim 9.

11. A system for forwarding calls placed to a primary phone number comprising:

a processor operatively connected to a memory, the memory comprising data and instructions to configure the processor to:

receive at least one call forwarding profile, the at least one call forwarding profile having a predefined duration, at least one call forwarding phone number, and at least one predetermined time period of activation within the predefined duration for forwarding calls placed to the primary phone number to the at least one call forwarding phone number;

receive an instruction to activate the at least one call forwarding profile; and forward calls placed to the primary phone number according to the activated call forwarding profile, wherein the at least one call forwarding profile defines at least one predetermined time period within the predefined duration in which calls placed to the phone number are not forwarded.

12. The system according to claim 11, wherein the at least one call forwarding profile is automatically de-activated after the duration has elapsed.

13. The method of claim 2, wherein during at least one of the two or more predetermined time periods of activation calls placed to the primary phone number are forwarded to the at least one call forwarding phone number, and during at least one of the two or more predetermined time periods of activation calls placed to the primary phone number are forwarded to a second forwarding phone number.

14. The data processing system of claim 6, wherein the time data further represents at least one of the two or more predetermined time periods of activation and calls placed to the primary phone number are forwarded to the at least one call forwarding destination, and during at least one of the two or more predetermined time periods of activation calls placed to the primary phone number are forwarded to a second forwarding destination.

15. A method of forwarding calls placed to a primary phone number comprising:

receiving at least one call forwarding profile, the at least one call forwarding profile having a predefined duration, at least one call forwarding phone number, and at least one predetermined time period of activation within the predefined duration for forwarding calls placed to the primary phone number to the at least one call forwarding phone number;

receiving an instruction to activate the at least one call forwarding profile; and forwarding calls placed to the primary phone number according to the activated call forwarding profile, wherein the at least one call forwarding profile is automatically de-activated after the duration has elapsed.

16. The method of claim 15, wherein the at least one call forwarding profile defines two or more predetermined time periods of activation within the predetermined duration for forwarding calls placed to the primary phone number.

17. The method according to claim 15, wherein the at least one call forwarding profile defines at least one predetermined time period within the predefined duration in which calls placed to the phone number are not forwarded.

18. The method of claim 15, wherein the instruction to activate the at least one call forwarding profile is generated in response to a trigger.

19. The method of claim 18, wherein the trigger is selected from the group comprising of time of day, calendar date, day of the week, calendar hook and user input.

20. A data processing system having a processor and a memory for storing data for access by an application program being executed on the data processing system, the data processing system being configured by the application program to process a data structure for a call forwarding profile stored in the memory, the data structure comprising:

call data comprising destination data representing at least one call forwarding destination;

duration data representing a duration of the at least one call forwarding profile;

time data representing at least one predetermined time period of activation within the duration for forwarding calls to the at least one call forwarding destination; and initiation data corresponding to a trigger for activating the at least one call forwarding profile, wherein the at least one call forwarding profile is automatically de-activated after the duration has elapsed.

21. The data processing system according to claim 20, wherein the at least one call forwarding profile defines at least one predetermined time period within the predefined duration in which calls placed to the phone number are not forwarded.

22. The data processing system of claim 20, wherein the trigger is selected from the group comprising of time of day, specific date, day of the week, calendar hook and user input.

23. A computer readable storage device storing statements and instructions for use in the execution in a computer of the method of claim 15.

24. A wireless device comprising the readable storage device of claim 23.

25. A system for forwarding calls placed to a primary phone number comprising:
- a processor operatively connected to a memory, the memory comprising data and instructions to configure the processor to:
- receive at least one call forwarding profile, the at least one call forwarding profile having a predefined duration, at least one call forwarding phone number, and at least one predetermined time period of activation within the predefined duration for forwarding calls placed to the primary phone number to the at least one call forwarding phone number;
- receive an instruction to activate the at least one call forwarding profile; and
- forward calls placed to the primary phone number according to the activated call forwarding profile,
- wherein the at least one call forwarding profile is automatically de-activated after the duration has elapsed.

26. The system according to claim 25, wherein the at least one call forwarding profile defines at least one predetermined time period within the predefined duration in which calls placed to the phone number are not forwarded.

27. The method of claim 16, wherein during at least one of the two or more predetermined time periods of activation calls placed to the primary phone number are forwarded to the at least one call forwarding phone number, and during at least one of the two or more predetermined time periods of activation calls placed to the primary phone number are forwarded to a second forwarding phone number.

28. The data processing system of claim 21, wherein the time data further represents at least one of the two or more predetermined time periods of activation and calls placed to the primary phone number are forwarded to the at least one call forwarding destination, and during at least one of the two or more predetermined time periods of activation calls placed to the primary phone number are forwarded to a second forwarding destination.

\* \* \* \* \*